(12) United States Patent
Kongelbeck et al.

(10) Patent No.: US 7,079,070 B2
(45) Date of Patent: Jul. 18, 2006

(54) RADAR-FILTERED PROJECTILE

(75) Inventors: Knut Kongelbeck, Chatsworth, CA (US); Ada Mendelovicz, Northridge, CA (US)

(73) Assignee: Alliant Techsystems Inc., Edina, MN (US)

( * ) Notice: Subject to any disclaimer, the term of this patent is extended or adjusted under 35 U.S.C. 154(b) by 842 days.

(21) Appl. No.: 10/215,475

(22) Filed: Apr. 15, 2002

(65) Prior Publication Data

US 2005/0253017 A1 Nov. 17, 2005

Related U.S. Application Data

(60) Provisional application No. 60/284,004, filed on Apr. 16, 2001.

(51) Int. Cl.
*F41G 7/00* (2006.01)
*G01S 13/00* (2006.01)

(52) U.S. Cl. ............ 342/62; 342/61; 342/175; 342/195; 244/3.1; 244/3.11; 244/3.14; 244/3.15; 244/3.19

(58) Field of Classification Search ......... 244/3.1–3.3; 342/61–68, 175, 195; 343/705
See application file for complete search history.

(56) References Cited

U.S. PATENT DOCUMENTS

| | | | | |
|---|---|---|---|---|
| 2,176,469 | A | * | 10/1939 | Moueix ................. 342/62 |
| 2,579,823 | A | * | 12/1951 | Homrighous ........... 244/3.15 |
| 3,392,396 | A | | 7/1968 | Ehrenspeck |
| 4,179,088 | A | * | 12/1979 | French ................. 244/3.19 |
| 4,476,785 | A | | 10/1984 | Hoffman |
| 4,591,865 | A | | 5/1986 | Canal |
| 4,679,748 | A | * | 7/1987 | Blomqvist et al. ...... 244/3.19 |
| 4,925,129 | A | | 5/1990 | Salkeld |
| 5,099,246 | A | * | 3/1992 | Skagerlund ............ 244/3.14 |
| 5,131,602 | A | * | 7/1992 | Linick ................ 244/3.14 |
| 5,163,637 | A | * | 11/1992 | Hansen ................ 244/3.21 |
| 5,372,334 | A | * | 12/1994 | Cuadros ............... 244/3.11 |
| 5,414,430 | A | * | 5/1995 | Hansen ................ 244/3.14 |
| 5,425,514 | A | | 6/1995 | Grosso |
| 5,529,262 | A | | 6/1996 | Horwath |
| 5,669,581 | A | | 9/1997 | Ringer |
| 5,685,504 | A | | 11/1997 | Schneider |
| 5,788,178 | A | | 8/1998 | Barrett, Jr. |

(Continued)

*Primary Examiner*—Bernarr E. Gregory
(74) *Attorney, Agent, or Firm*—Michael Blaine Brooks, P.C.; Michael B. Brooks; Bruce Anderson

(57) ABSTRACT

Disclosed is an autonomous radar guidance of an otherwise radar-directed projectile (RDP). The preferred embodiment uses an inexpensive radar receiver with an inexpensive slow wave antenna, placed internally in a gun projectile, and on the surface of the projectile, respectively. The receiver detects the angle and range of the target relative to the body coordinates of the projectile. The radar receiver operates as a bistatic radar apparatus with the primary illumination emanating from the fire control radar directing the fire of the gun. When integrated with an on-board trajectory correcting system, such as divert thrusters of miniature proportions, the projectile autonomously refines its otherwise ballistic trajectory to the target. The trajectory refinements produce improved kills per round, with the potential for reducing the ammunition expended and time-loading on the fire control system and its guns. An alternative embodiment, in addition to receiving the target-reflected fire control emissions, receives and processes the fire control radar emissions directly in order to enhance homing accuracy.

25 Claims, 11 Drawing Sheets

U.S. PATENT DOCUMENTS

| | | |
|---|---|---|
| 5,841,059 A | 11/1998 | Laurend |
| 6,137,453 A | 10/2000 | Wang |
| 6,450,442 B1 * | 9/2002 | Schneider et al. ......... 244/3.14 |
| 6,483,455 B1 * | 11/2002 | Fleury et al. ................. 342/62 |
| 6,724,341 B1 * | 4/2004 | Pereira et al. ................ 342/62 |
| 6,727,843 B1 * | 4/2004 | Hansen ........................ 342/62 |

* cited by examiner

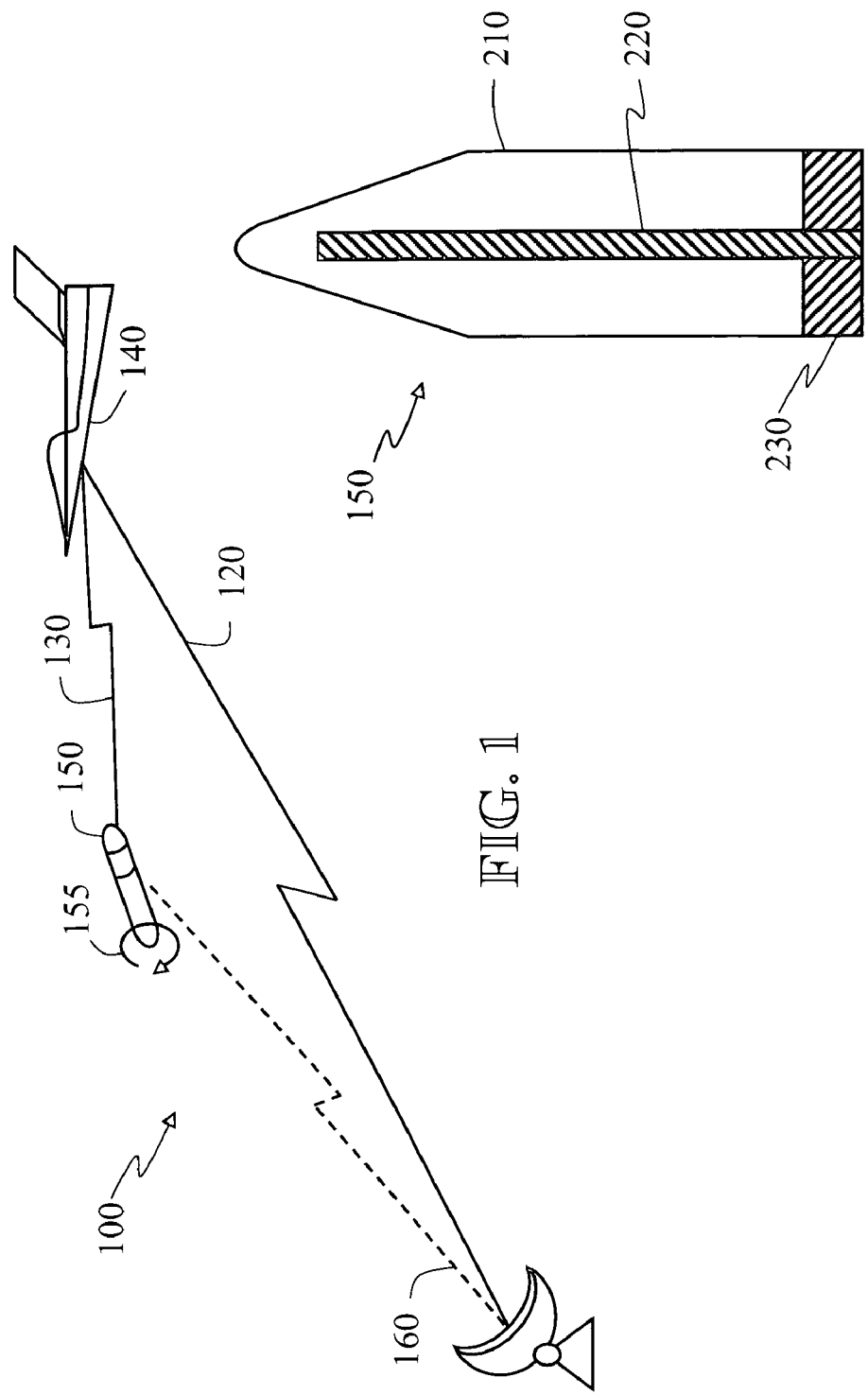

RADAR-FILTERED PROJECTILE

CROSS-REFERNCE TO RELATED APPLICATIONS

This application claims the benefit of provisional patent application No. 60/284,004 filed Apr. 16, 2001, of Knut Sverre Kongelbeck and Ada Mendelovicz, entitled "RADAR DIRECTED PROJECTILE," the contents of which are hereby incorporated by reference in its entirety for all purposes.

FEDERALLY SPONSORED RESEARCH

Not applicable.

BACKGROUND—TECHNICAL FIELD OF THE INVENTION

This invention relates to guided projectiles in general and more particularly to the method and apparatus for the autonomous radar guidance of an otherwise radar-directed projectile (RDP).

BACKGROUND—PRIOR ART

The prior art pertaining to guided projectiles includes the fire control/weapon systems in which they may be implemented, the projectiles themselves, their guidance systems and the constituent on-board sensing elements and supporting data processing and trajectory correcting means that enable autonomous projectile homing.

U.S. Pat. No. 5,669,581 issued Sep. 23, 1997 to H. N. Ringer and assigned to Aero-Jet General Corporation discloses a spin-stabilized projectile for destroying a distant target using the projectile's spin to carry out functions beyond stabilization such as target imaging, course-correction, and warhead-aiming. The Ringer patent discloses the use of diverting thrusters and describes the use of an imaging array of infrared detectors for scanning images and pitch thrusters for pitch control.

U.S. Pat. No. 5,425,514 issued Dec. 29, 1993 to V. A. Grosso and assigned to Raytheon Company discloses a spin-stabilized projectile using a directional thruster nozzle acoustically coupled to the guidance electronics in the nose section for control of coning, nutation, precession and lateral maneuverability via angle-of-attack. The Grosso patent further discloses a laser illuminator driven by a fire control system whereby the projectile's optical (infrared) telescope develops a boresight error to be used in steering and also discloses an alternative embodiment of a purely aerodynamic type with a screw-on wrap-around tail-section and a screw-on seeker and guidance section.

U.S. Pat. No. 5,685,504 issued Nov. 11, 1997 to A. J. Schneider, et al. and assigned to Hughes Missile Systems Company discloses a system using off-board target laser illumination and tracking together with off-board projectile laser tracking to generate and then up-link to the projectile the necessary divert commands. The Schneider patent further discloses the use of either aerodynamically or thruster controllable and maneuverable projectiles.

U.S. Pat. No. 5,788,178 issued Aug. 4, 1998 to R. F. Barrett discloses a small caliber laser-guided bullet of negligible axial spin having a self contained guidance system including on-board laser sensors and navigational circuits capable of detecting a laser target signature, determining the deviation of the bullet from an optimal trajectory along which the bullet would impact a hostile target, and generating an electrical signal to piezoelectric steering control surfaces to effect a change in the course of the bullet. Barrett further discloses the use of logic circuits to process sensor pulses into steering commands of a 0.5 caliber (12.7 mm) projectile fired from a smooth bore barrel.

U.S. Pat. No. 5,529,262 issued Jun. 25, 1996 to T. G. Horwath discloses a guidance seeker for a spinning projectile defined by its angular momentum vector, comprising a lens system or a millimeter-wave antenna for receiving radiation derived from a target and forming an image of the target. Horwath further discloses a thruster control scheme and a multimode sensor configuration.

U.S. Pat. No. 5,392,393 issued Jul. 9, 1968 to H. W. Ehrenspeck discloses an endfire antenna having surface wave propagation along the longitudinal axis thereof and being tunable to maximal gain for any preselected frequency within a predetermined frequency range. The endfire antenna disclosed includes a transverse feed and endfire reflector with an associated guide element. Ehrenspeck further discloses a dielectric rod endfire antenna of rectangular shape in cross-section and linearly tapered in thickness in the longitudinal axis.

U.S. Pat. No. 4,591,865 issued May 27, 1986 to Y. S. Canal et al. and assigned to Philips Corporation discloses a rectangular parallelpiped bidirectional antenna, containing a dielectric material and having a metal-plated surface that is designed to radiate decimetric or centrimetric waves. The antenna is disclosed as exhibiting highly directional patterns with low sidelobes and to be of simple construction.

U.S. Pat. No. 6,137,453 issued Oct. 24, 2000, to J. J. H. Wang, et al. and assigned to Wang Electro-Optical Corporation discloses a broadband, miniaturized, slow-wave antenna for transmitting and receiving radio frequency signals. The slow-wave antenna comprises a dielectric substrate with a traveling wave spiral structure mounted on a surface, and a conductive surface member mounted on the opposite surface.

U.S. Pat. No. 4,925,129 issued May 15, 1990 to D. Salkeld, et al., and assigned to British Aerospace, PLC, discloses a missile defense system for guiding a subprojectile to intercept and destroy a target that includes a radar tracker to acquire and track the target, predictor means for determining the predicted track of the target, and a guided projectile for being guided onto a rear reciprocal track of the target. The patent also discloses a guided projectile that includes an optical tracker for acquiring and tracking the target at relatively small distances and a sub-projectile for being guided on the line-of-sight from the optical tracer and the target.

U.S. Pat. No. 4,476,785 issued Oct. 16, 1984 to Hoffman, et al., and assigned to Mauser-Werke Oberndorf GmbH discloses a hood covering for a subcaliber projectile. U.S. Pat. No. 5,841,059 issued Nov. 24, 1998 to P. Laurend, et al., and assigned to Luchaire Defense, S.A., discloses a laser-homing subcaliber projectile that is a spinning, parachuting projectile that detects and fuzes on target-reflected laser emissions.

Modernly, a fire control radar with a radar-directed gun can be explained by example with the Phalanx Close-In Weapon System (CIWS). The Phalanx CIWS is a point defense weapon that fires 20 mm projectiles at a rate of around 3,000 to 4,500 rounds per minute in bursts of 60 to 100 rounds. The gun system autonomously acquires and engages the target. The radar tracks the stream of bullets and the target. The aim of the gun is corrected continually so that the stream of bullets will intersect the target.

The lethality of a radar-directed gun and the Phalanx in particular could be improved by adding a capability to its projectiles for autonomous guidance. Meaning that should a projectile determine or otherwise estimate that it was about to miss its target, it could divert its trajectory to correct for the miss. The system benefit of this capability would be to reduce the number of projectiles necessary to destroy a target and an associated unburdening of the fire control system. In addition, by increasing the probability of a given round successfully destroying its intended target, the effective lethal range of a radar-directed gun like the Phalanx could be increased. The benefit of the extended lethal range is the improved survivability of the Phalanx-hosting platform.

SUMMARY OF THE INVENTION

Disclosed is a projectile for destroying, disabling, or intercepting close-in targets using a noncoherent RF receiver to receive via a slow-wave, endfire antenna, and a microcomputer to process the received signals into guidance signals for one or more divert charge firings. An alternative embodiment receives direct fire control radar signals in addition to the reflected fire control signals for guidance processing. Alternative embodiments include piezoelectrically actuated aerodynamic augmentation in addition to or as a replacement for divert thrusters.

An object of the present invention is to improve the accuracy of projectiles by an on-board guidance system with the projectile capable of sensing target-reflected, and, as an option, the direct RF emissions of a fire control radar and the onboard guidance thereby generating trajectory-modifying commands to trajectory augmenting means.

BRIEF DESCRIPTION OF THE DRAWINGS

FIG. 1 illustrates the general encounter geometry.

FIG. 2 illustrates the orientation of the slow-wave, end-fire antenna placed longitudinally along the projectile.

DETAILED DESCRIPTION OF THE PREFERRED EMBODIMENT

Figure 3:
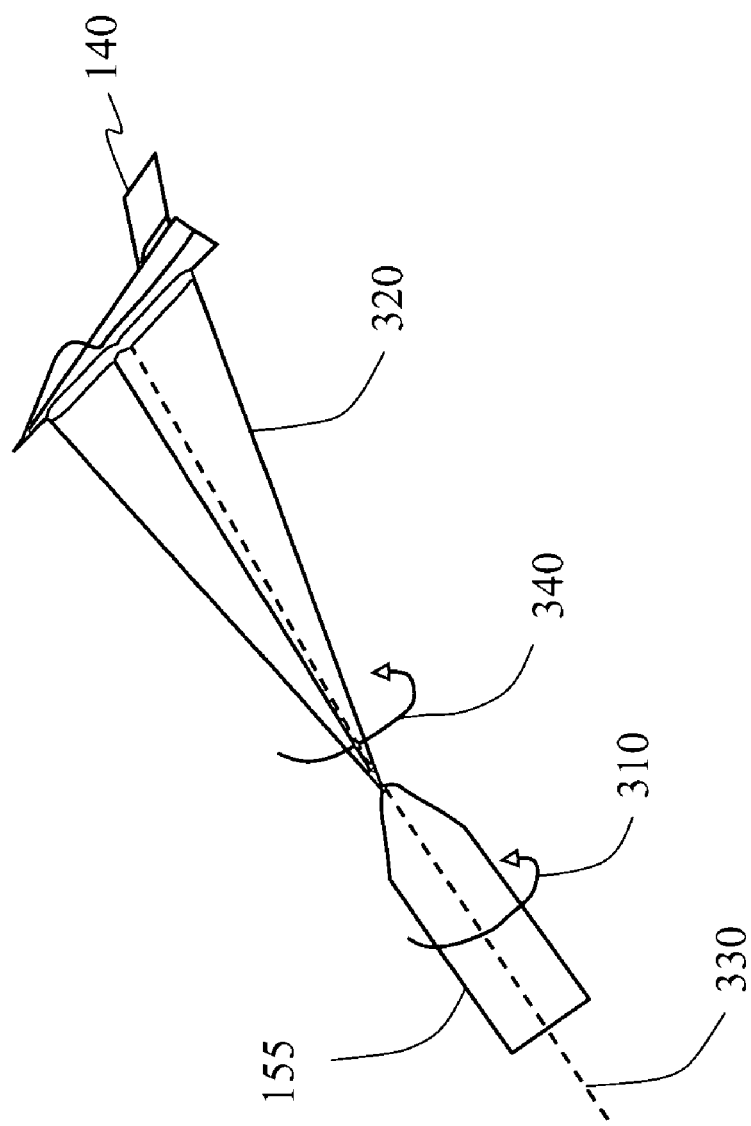
FIG. 3 illustrates the rotation of the projectile providing a conical scan-like mechanism for computing angle-of-arrival information.

FIG. 1 illustrates the general encounter geometry 100 where the fire control radar 110 generates RF signals 120, as reflected 130 from the target 140, are received by a projectile 150 with a stabilizing spin 155. As an alternative embodiment, the projectile additionally receives and processes the direct radar transmissions 160 of the fire control radar.

FIG. 2 illustrates, by way of example and not limitation, the autonomous radar-directed projectile of the present invention 150 and more particularly illustrates the end-fire, slow wave antenna element 220 longitudinal orientation relative to the projectile body 210, that is, along the length of the projectile and the location of the guidance electronics 230 at the aft portion of the projectile body 210. The characteristic of the end-fire mechanism is that the width of the radar receiver beam is determined by the length not the width of the antenna. By placing such a structure along the projectile, the present invention exploits the maximal available dimension. It is well understood by practitioners in the art of RF antennas that because of the slow wave propagation, the antenna's effective electrical length will be longer than its physical length, which will further contribute to narrowing the beam. In addition, it is well understood that the antenna beam will be squinted with respect to the boresight (i.e., axis of symmetry) of the projectile because of the physical structure, material properties of the projectile, and the characteristics of the antenna.

In one embodiment the radar-directed projectile possesses a stabilizing spin rate upon exit of a rifled gun muzzle and this spin may persist until target impact. FIG. 3 illustrates that because of the projectile spin 310, the squinted antenna beam 320 of the slow wave, end-fire antenna 220 (FIG. 2) is rotated about the boresight 330, i.e., the principal, longitudinal axis of the projectile 155. The rotating 340 of the beam 320 functions analogously to a conical scanning mechanism and thus supports an angle measurement approach similar to a conical scan.

Practitioners in the art will recognize that a RF source of appropriate frequency, oriented in collinear fashion with the projectile boresight 330, will deliver substantially constant energy on the receiving antenna element. Whereas, a RF source oriented off the boresight will cause the element to receive energy and generate voltages that appear as a modulated sine wave whose frequency will be the rotation rate of the projectile. The amplitude and phase of this sine wave is used to determine the target's position with respect to the body coordinates of the projectile.

Figure 4:
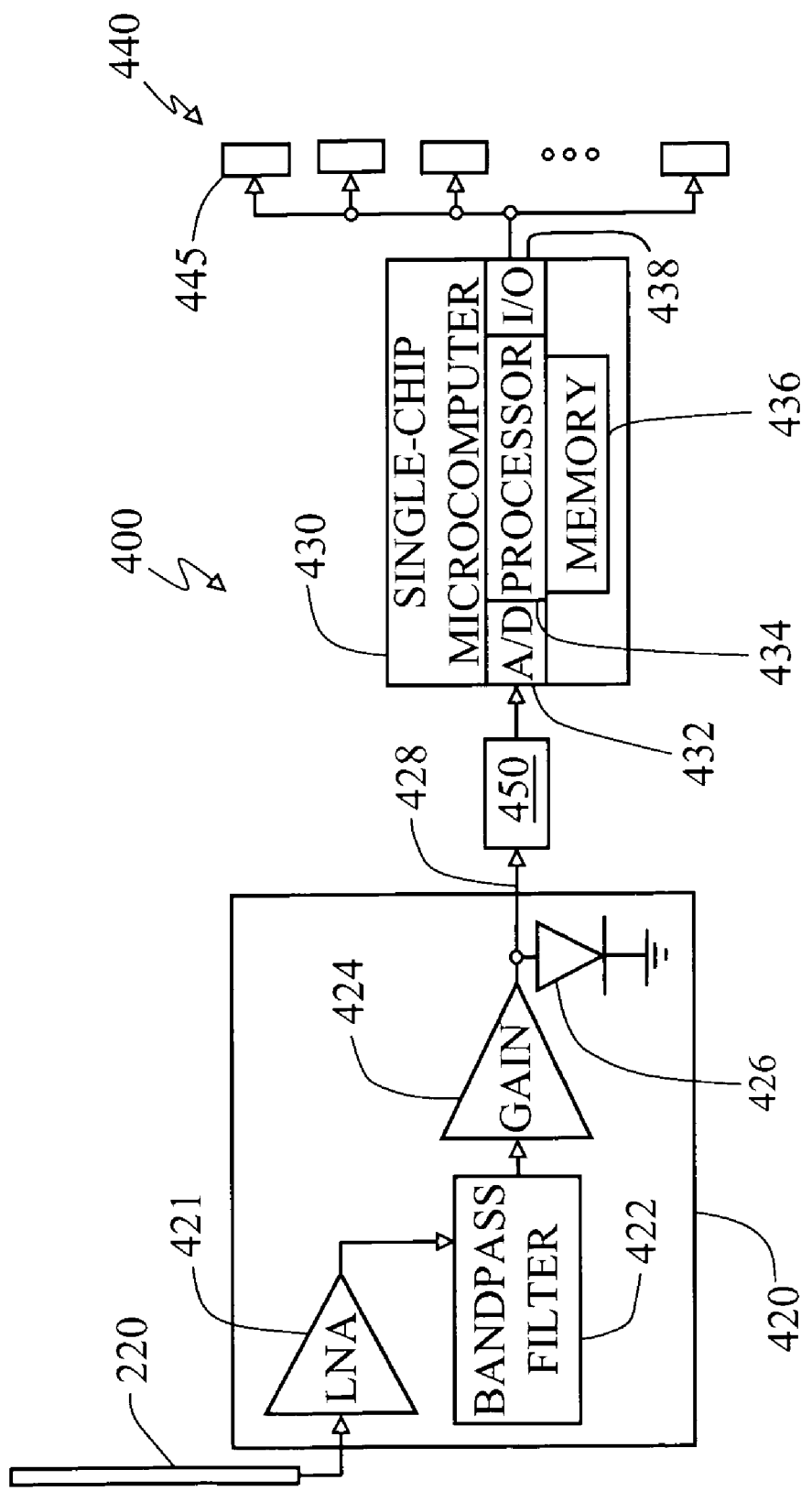
FIG. 4 is a functional block diagram of the present invention.

FIG. 4 shows a functional block diagram of the RDP subsystems 400 employing, for example, divert charges as a means for correcting the projectile's trajectory. The RDP, as embodied in a projectile, comprises: (a) a slow wave, end-fire antenna 220; (b) a non coherent receiver preferably integrated into a single GaAs chip 420 further comprising a bandpass filter 422, a gain stage 424 and a detector 426; (c) a single chip microcomputer 430 comprising an analog-todigital converter 432, a processor 434, memory 436, and an input-output interface 438; (d) an array 440 of explosive divert charges 445; a video filter 450 and (e) a power subsystem that comprises a power supply and one or more batteries(not shown). Preferably, the total electronics comprised no more than three relatively small, monolithic components.

In a classical conical scan system, a gimbal is typically adjusted to place the target signature in the center of the discriminant function. The body-fixed antenna element precludes gimbal adjustment approaches. In monostatic, linearly-polarized, conical scans, the return signal is independent of the angular orientation of the radar. In a system in which the antenna is body mounted, the independence is lost because as the projectile rotates, the polarization vector of its body-fixed antenna rotates. The received signal polarization is only a function of the 12 target and the transmitter. The return signal is multiplied by the dot product of the receive antenna polarization and the polarization of the received signal. The received signal is multiplied by the rotational position of the projectile and the polarization vector of the target. Because the nature of the polarization effect is not a function of the position of the target off boresight, the angle discriminant function eliminates the polarization effect. In cases where the received polarization vector can change rapidly with respect to the projectile rotation rate, two antennas will be required.

The preferred embodiment with its conical scan mechanism described above exhibits the economy of a single antenna. Alternative embodiments include multiple antenna elements. An alternative embodiment employing two endfire antenna elements and two input receiver channels provides two channels of output preferably processed using an Amplitude Comparison Monopulse Algorithm (ACMA). This approach of two or more elements and an algorithm like the ACMA, while more complex, produces improved quality of angle measurements for wider antenna beams.

In driving to minimal size and cost with existing technology, the receiver system of the RDP is relatively straightforward. As was illustrated in FIG. 4, the receiver path consists of a filter 422, that, in the preferred embodiment is preceded by a low noise amplifier (LNA) 421, a gain stage 424 follows the filter 422, and precedes a noncoherent detector 426, where, in a preferred embodiment, the noncohoerent receiver is a crystal video receiver. All of these particular elements are preferably embodied in a single GaAs chip 420. Such a system lacks adequate signal processing gain for most conventional radar applications. However, it is well suited for the RDP application because it can take advantage of the high illumination power of the fire control radar, whether as reflections from the target or as signals received directly.

An analog-to-digital converter 432 ("A/D converter" or ADC) samples the output of the detector. The ADC is embedded preferably in an adjacent microprocessor 430 and in the preferred embodiment, the samples of the output of the detector 428 are passed through a video filter 450 before being passed to the ADC 432. The microprocessor executes digital signal processing software that works to extract angle information using either the conical scan or an amplitude comparison monopulse algorithm. The angle modulation information is used to develop angle error signals that are fed to digital filtering, a Kalman tracking filter, for example, that is also implemented as software in the microprocessor. The digital filtering will have the effect of providing an optimal, or nearly optimal, filtering time for the angle-of-arrival information.

In addition to being able to extract angle information, this invention is capable of extracting range information. The fire control radar will illuminate both the target and, due to geometric proximity, the projectile. Because the RDP will know the pulse repetition frequency (PRF) of the transmitting radar, it can use this information to calibrate its internal clock; a clock that can be used for range estimation. The preferred antenna element used in this invention detects the transmitted radar pulses through its backlobe. By measuring the time between the receipt of the transmitted pulse and its identified reflection from the target, the signal processing within the microprocessor computes the range to the target.

After generating a discrete steering command sequence based on determined miss distance minimizing (homing) parameters like range-to-go, the stabilized error angle equivalents of line-of-sight angle and angular velocity, discrete guidance commands the RDP steers by firing at least one divert charge stored within the projectile. A more granular firing train can be achieved by well-timed and successive firings of the divert charges. An alternative guidance approach is generally continuous in implementation of the guidance law and steering commands and uses piezoelectrically actuated aerodynamic surfaces. The RDP processing tracks its target with respect to its own body reference frame. The RDP processing manages the divert firings based on a priori information regarding the position of the divert charges with respect to its own body coordinates. So long as the coning angle and motion, as well as the nutation and precession motions, remain negligible, the discrete divert thrusters position and status together with the angle-of-arrival and relative range estimates will all be used to effectively fire one or more discrete divert thrusters and by doing so steer the projectile toward an intercept with the target without the use of inertial instrumentation.

Slow Wave, End-Fire Antennas

The one or more antennas applied to the RDP are lightweight and mechanically simple. A slow wave structure is well suited to homing projectile application. This particular antenna launches a surface wave along the structure to its end.

At least two implementations of a slow wave end-fire structure are applicable in the present invention. The first is a dielectric rod or a dielectric slab, the specific cross section of which is dependent on the projectile and fire control radar used, and the other is a corrugated metal conductor. In addition, the slow wave structure is conformal to the exterior projectile profile and, by necessity, can be embedded in the skin of the projectile.

Figure 5:
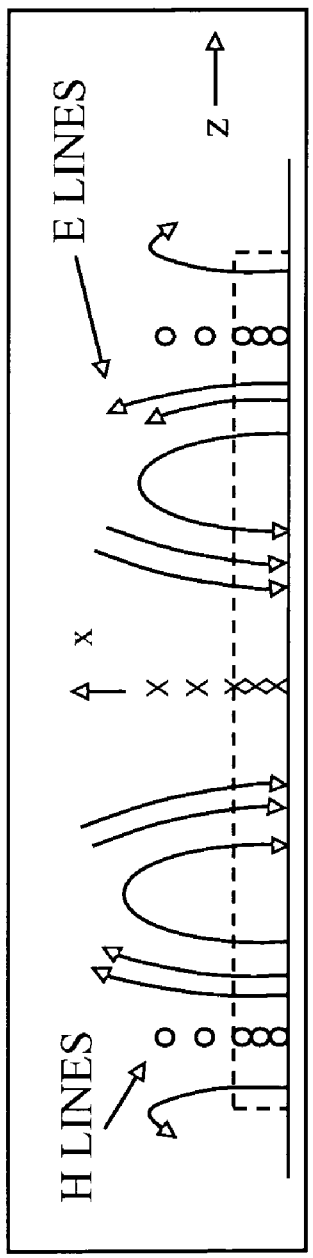
FIG. 5 shows the electromagnetic fields of a conductor coated by a dielectric rectangular slab.

FIG. 5 shows the electromagnetic fields of a conductor coated by a dielectric rectangular slab. Propagation is in z direction. Exponential decay is in x direction. This is the dielectric slab alternative of the slow wave, end-fire antenna.

The electric and magnetic fields shown in FIG. 5 apply to either structure. Slowing the wave makes the electrical length longer and will help to increase gain and decrease the main beamwidth.

The dielectric rod mechanism operates as a waveguide of a surface wave, trapped more tightly, or less so depending on the value of the dielectric constant, with energy radiating out the ends of the rod. The slow wave character is produced by the dielectric constant of the material.

Figure 6:
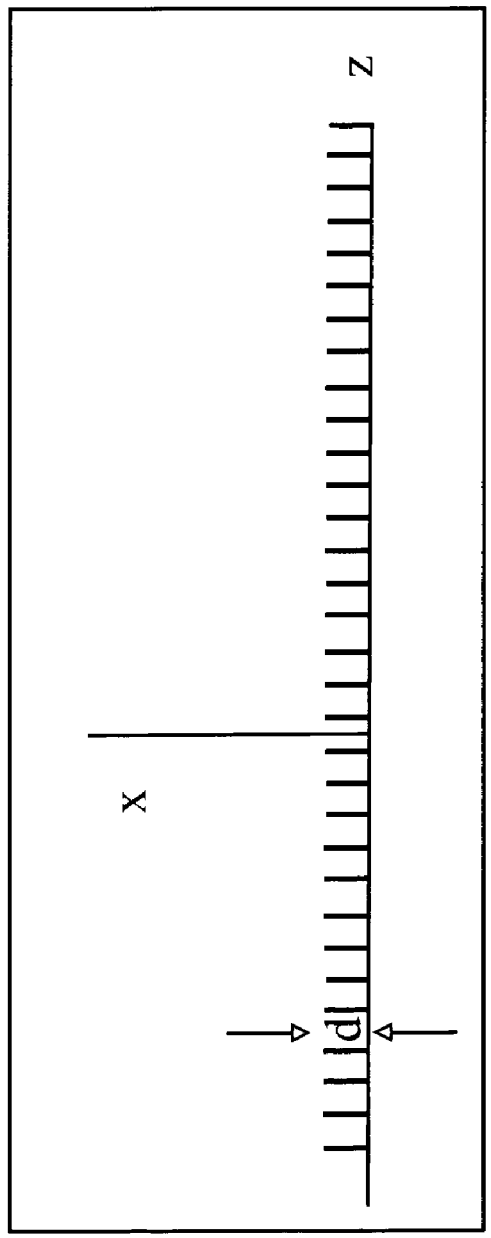
FIG. 6 illustrates a corrugated conductor, which behaves physically as an artificial dielectric, comparable to that depicted in FIG. 5.

FIG. 6 illustrates a corrugated conductor. The electromagnetic field looks as depicted in FIG. 5 where propagation is in z direction. The corrugated metal structure of FIG. 6 operates in a fashion similar to dielectric rod mechanism with the slow wave characteristic deriving from the metal teeth.

Dielectric Constants and Slowing the Wave

The two previously described embodiments exhibit effective dielectric constants that slow the wave as it propagates along the z-axis. For the case of the corrugated conductor, the effective dielectric constant is given by a transcendental equation that relates it to the geometry of the corrugated conductor(for example the height, d, of the corrugated metal teeth) and to the various propagation constants of the artificial dielectric, that the corrugation generates.

As described, the range estimation relies on receiving the transmitted pulse in the backlobes of the slow wave, end-fire antenna. Slow wave antennas such as those applied in the present invention, possess gains in their backlobes on the order of 25 dB to 30 dB below the peak gain. Where the fire control radar is of sufficient strength, the illumination through the backlobe of the dielectric rod antennas may suffice for detection, Where fire control radar is of insufficient strength, the backlobe does not provide adequate gain to detect the transmitted pulse, and a short dipole or slot antenna (depending on the needed polarization for successful detection) can be affixed to the endof the projectile. A power splitter to the receiver connects the additional antenna. The preferable power splitting is n:1, where n is larger than 2, such that most of the rod antenna power will be channeled to the receiver.

Noncoherent Receiver

The electronics, as illustrated in FIG. 4, are preferably as simple as practicable. The receiving electronics comprises a microwave filter followed by a GaAs amplifier and a diode detector. Preferably, the amplifier and detector are on a single GaAs chip. They are followed by a microcomputer in which the ADC, memory, processor electronics are preferably all packaged on one chip as well. An example of some of this small microwave technology prior art is shown in the active microwave filter in FIG. 18.

The use of a noncoherent detector 426 (see FIG. 4) provides a good deal of simplification and with it, cost effectiveness. It reduces the required sample rate of the microcomputer ADC 432 to a multiple of the fire control radar pulse repetition interval (PRI). While the ADC 432 will take a sample every range gate between transmitted pulses, once the target has been acquired in range and then angle processing is initiated, the processor will only look in the range gates in which the target is expected to be present.

Microcomputer

As described, the microcomputer 430 operates at relatively low data rates because of the noncoherent video detection. The microcomputer provides the hardware functions of: receiver control; timing generation; program memory management; data memory management; analog-to-digital conversion; and providing firing strobes to the divert charges. It provides the software functions of: target detection; radar range tracking; angle-of-arrival determining; timing calibration (using received PRF of the fire control radar); digital filtering (e.g., Kalman filtering) of angle and relative range information; and computing the time to fire divert charges.

Conical Scan and Discrimination

Figure 7B:
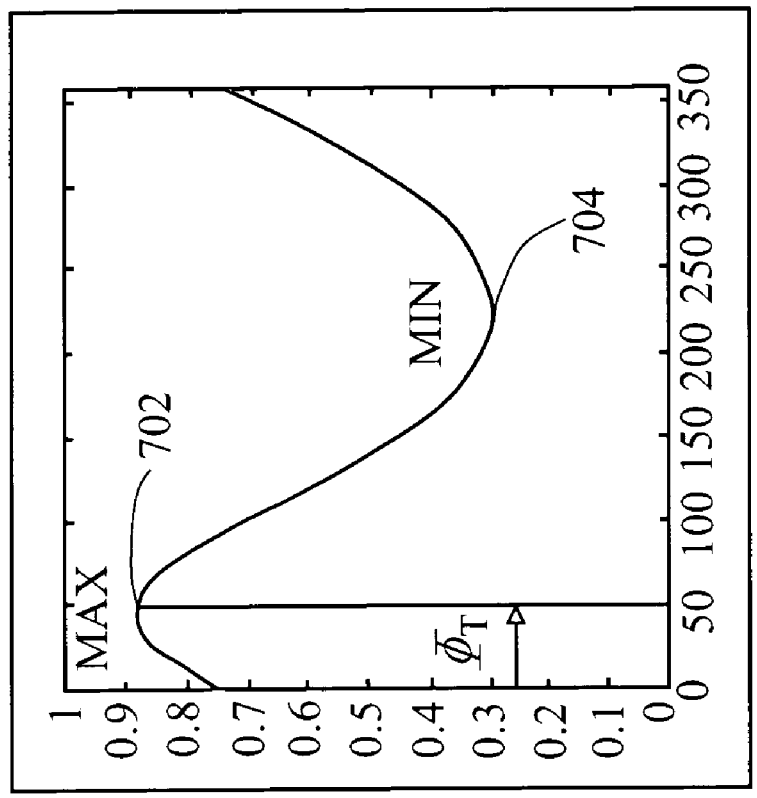
FIGS. 7A–B illustrate a conical scan and resulting sinusoid.
Figure 7A:
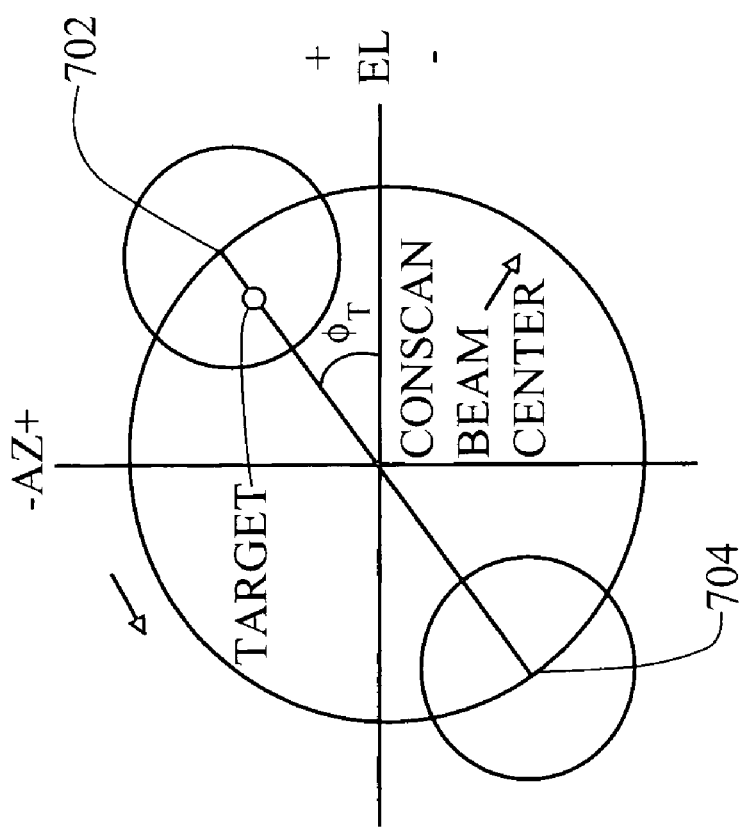
Figure 8:
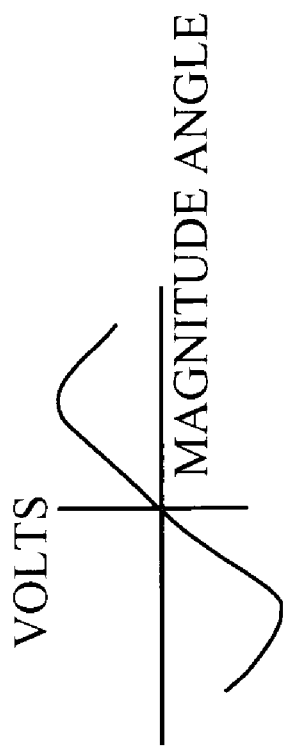
FIG. 8 illustrates a typical discrimination curve.
Figure 9:
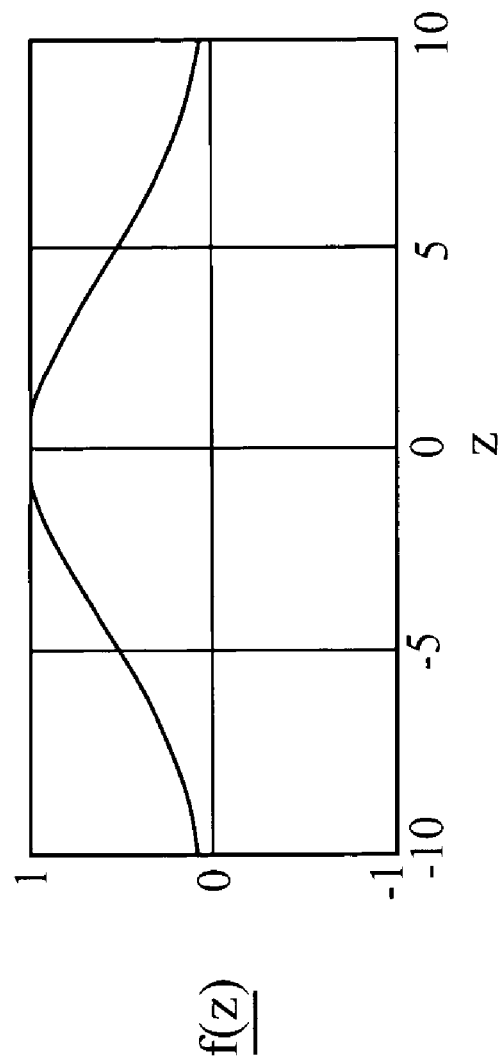
FIG. 9 illustrates the general shape of an antenna pattern of the present invention.
Figure 10:
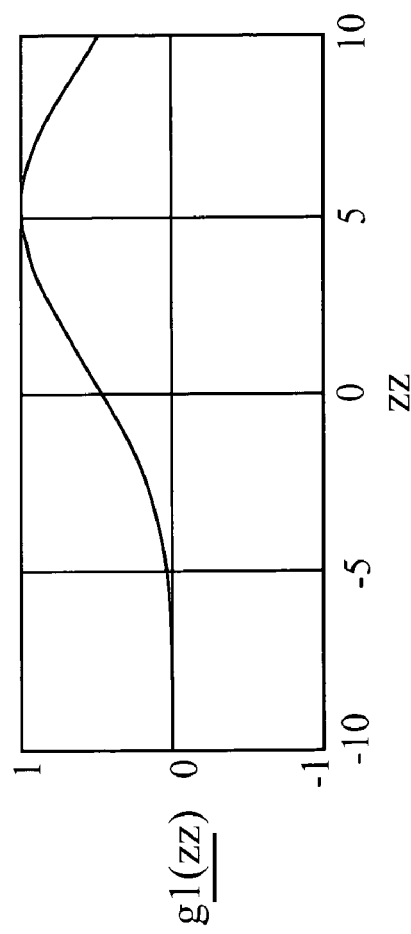
FIG. 10 illustrates the general shape of an antenna pattern of the present invention affected by squint angle at 0 degrees rotation.
Figure 11:
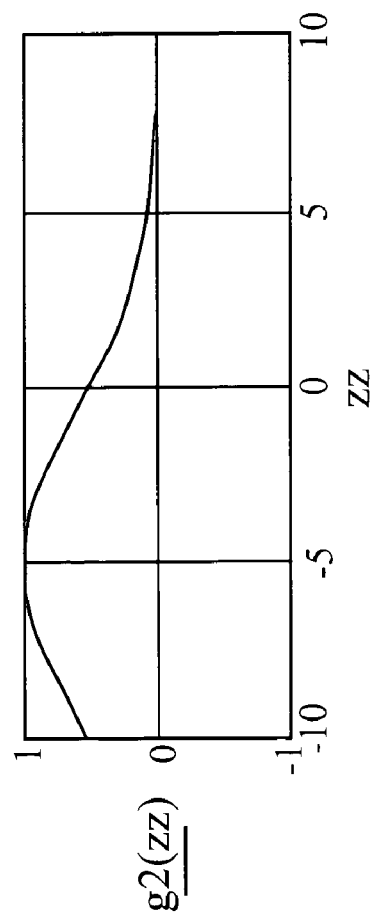
FIG. 11 illustrates the general shape of an antenna pattern of the present invention affected by squint angle at 180 degrees rotation.
Figure 12:
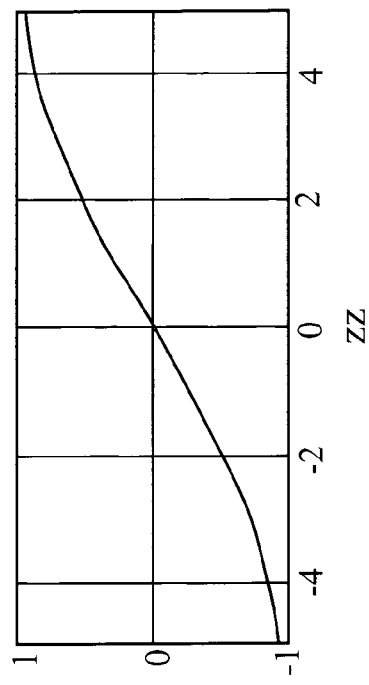
FIG. 12 illustrates the difference formed by the antenna outputs at 0 degrees and 180 degrees.
Figure 13:
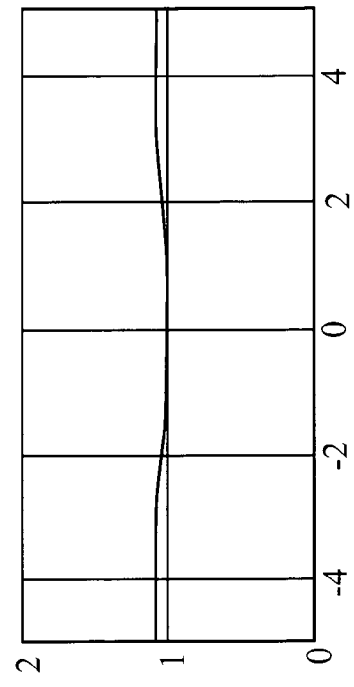
FIG. 13 illustrates the sum formed by the antenna outputs at 0 degrees and 180 degrees.
Figure 14:
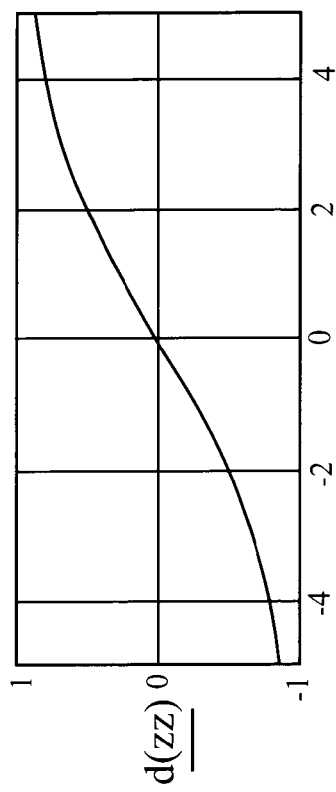
FIG. 14 illustrates the discriminator as the ratio of the difference over the sum.
Figure 15:
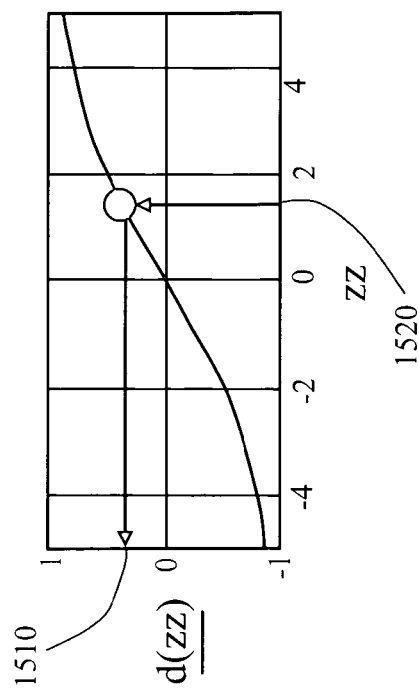
FIG. 15 illustrates the discriminator output being proportional to angle off boresight and independent of signal amplitude.
Figure 16:
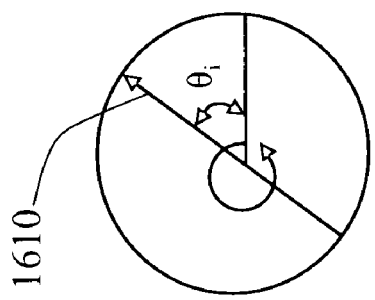
FIG. 16 illustrates the discriminant axis as rotating in space.
Figures 17A, 17B, 17C, 17D:
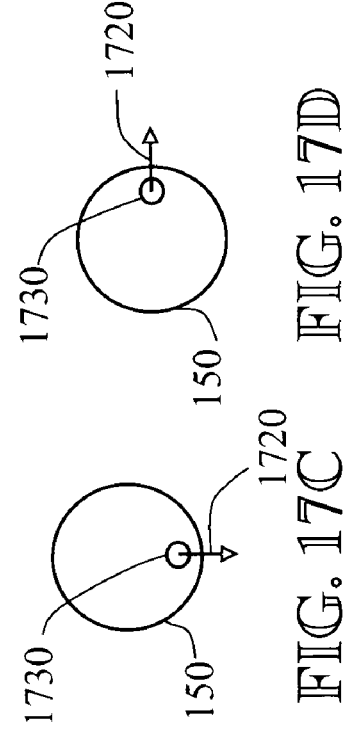
FIGS. 17A–D illustrate the rotation of the body-fixed polarization vector.

FIGS. 7A–B illustrate a conical scan and resulting sinusoid where the receptivity of the antenna is squinted off boresight producing a cycling radar return amplitude. Accordingly, the location of maximum determines angular position of target and the extent of modulation, that is, the difference between the maximum and minimum, determines angular radial distance of target from the conscan center. FIG. 8 illustrates a typical discrimination curve where the magnitude of the angle measurement voltage is a function of the antenna squint angle, the angle off boresight and the shape of the antenna beam. FIG. 9 illustrates the general shape of an antenna pattern of the present invention in one dimension. FIG. 10 illustrates the general shape of an antenna pattern of the present invention affected by squint angle at 0 degrees rotation. FIG. 11 illustrates the general shape of an antenna pattern of the present invention affected by squint angle at 180 degrees rotation. FIG. 12 illustrates the difference formed by the antenna outputs at 0 degrees and 180 degrees. FIG. 13 illustrates the sum formed by the antenna outputs at 0 degrees and 180 degrees. FIG. 14 illustrates the discriminator as the ratio of the difference over the sum. FIG. 15 illustrates the discriminator output 1510 being proportional to angle off boresight 1520 and independent of signal amplitude. To extend from one dimension to two dimensions we can think of the discriminant axis as rotating in space. To generate azimuth and elevation components, one extracts the in-phase and quadrature components of the measured angle. FIG. 16 illustrates the discriminant axis 1610 as rotating in space an angle, 81, from a reference axis, where the azimuthal angle can be found from $Az = \Sigma \Psi_i \cos(\theta_i)$ and the elevation angle can be found from $El = \Sigma \Psi_i \sin(\theta_i)$.

FIGS. 17A–D illustrate the rotation of the body-fixed polarization vector and polarization effect in bistatic linearly polarized radar. As projectile 150 rotates the polarization vector 1720 of its antenna 1730 rotates. The received signal polarization is only a function of the target and the transmitter. The return signal is multiplied by the dot product of the receive antenna polarization and the polarization of the received signal. The received signal is multiplied by the rotational position of the projectile and the polarization vector of the target. The angle discriminant function eliminates the polarization effect. The polarization effect is not a function of the position of the target off-boresight. The discriminant eliminates the polarization effects. One must take care in using too low of signal levels. When the received polarization vector changes rapidly with respect to the projectile rotation rate, two antennas may be required as an alternative embodiment.

Performance and the Preferred Embodiment

System performance is a function of a number of critical parameters. Projectile effectiveness can be assessed in those critical attributes that contribute to performance. The probabilities of detecting, tracking and intercepting the target are important statistics that spring from real-world parameters. Generally, with regards to the frequency of illuminating radar, a higher frequency provides better performance.

Similarly, a longer antenna element, and a bigger projectile with less ogive would end in radar performance. The Radar Cross Section (RCS) of the target and the range at which target is engaged, where closer range means more illuminating radar power, both relate back to the detection, tracking and intercepting of the target.

Figure 18:
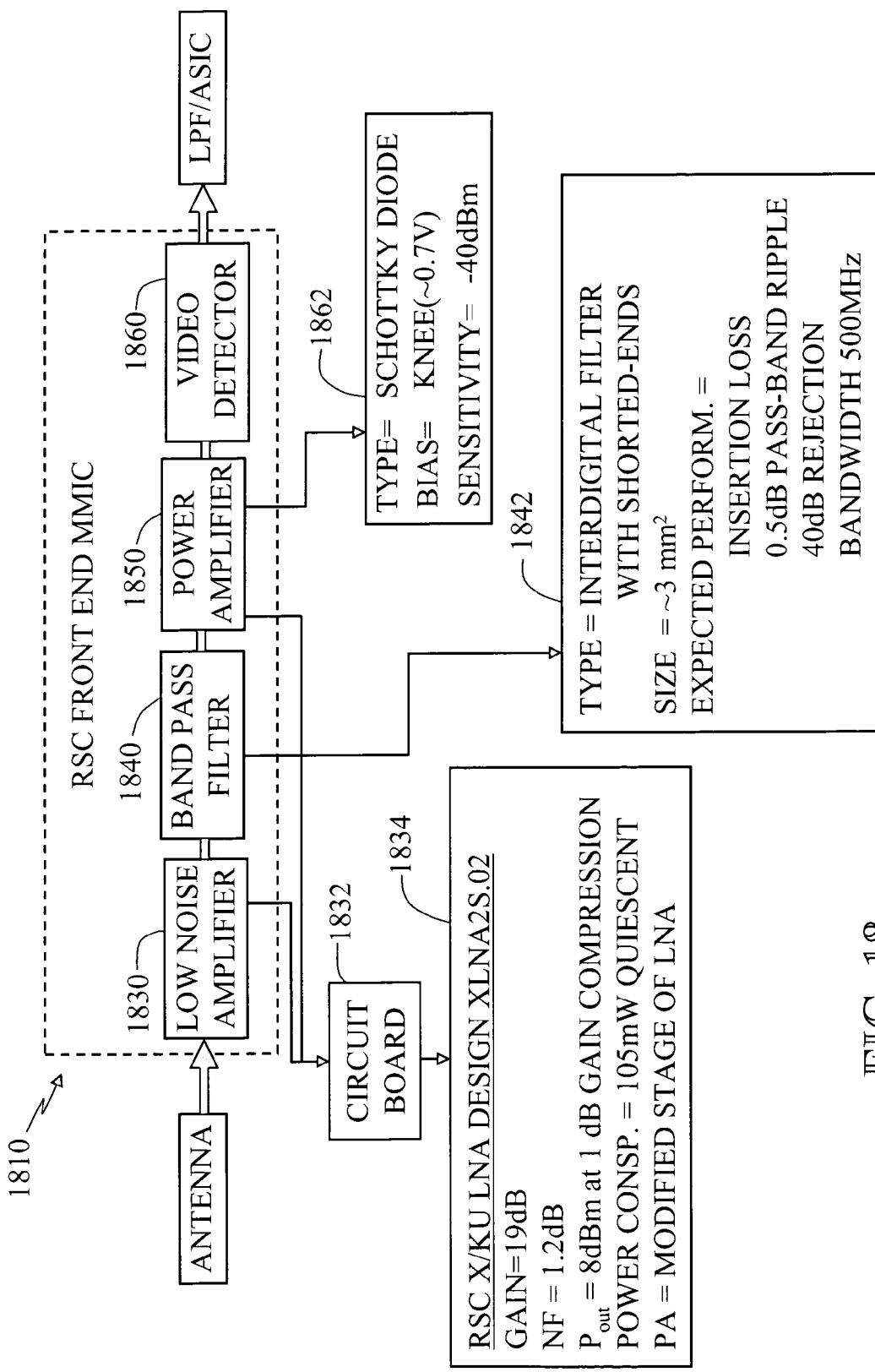
FIG. 18 is a block diagram of the signal processing of the preferred embodiment of the present invention.

FIG. 18 is a block diagram of the signal processing of the preferred embodiment of the present invention. The figure illustrates the Front End MMIC 1810 comprised of a low noise amplifier (LNA) 1830, a bandpass filter 1840 and parameters 1842, a power amplifier (PA) 1850 and a video detector 1860 and parameter 1862. Both the LNA 1830 and PA 1850 are also illustrated by example with a chip circuitry 1832 and parameters 1834. The preferred embodiment provides adequate acquisition range.

The present invention may of course be practiced in ways other than those specifically set forth herein without departing from the spirit and essential characteristics of the present invention. The present embodiments disclosed are therefore to be considered in all respects as illustrative and not restrictive or otherwise limiting and all changes coming within the meaning and equivalency range of the appended claims are intended to be embraced therein.

Alterations and modifications may be made by those having ordinary skill in the art without departing from the spirit and scope of the invention. Therefore, it must be understood that the illustrated embodiment has been set forth only for the purposes of example and that it-should not be taken as limiting the invention as defined by the following claims.

The words used in this specification to describe the invention and its various embodiments are to be understood not only in the sense of their commonly defined meanings, but to include by special definition in this specification structure, materials or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A radar-directed projectile guidance system comprising:
   (a) a first slow wave, end-fire antenna;
   (b) a noncoherent RF receiver; and
   (c) computing means for processing signals from the RF receiver.

2. The radar-directed projectile guidance system as claimed in claim 1 wherein the noncoherent RF receiver is integrated into a single GaAs chip.

3. The radar-directed projectile guidance system as claimed in claim 1 wherein the noncoherent RF receiver is a crystal video receiver.

4. The radar-directed projectile guidance system as claimed in claim 1 further comprising a second slow wave, end-fire antenna.

5. The radar-directed projectile guidance system as claimed in claim 1 further comprising a low noise amplifier preceding said noncoherent RF receiver.

6. The radar-directed projectile guidance system as claimed in claim 1 further comprising a power subsystem.

7. The radar-directed projectile guidance system as claimed in claim 1 wherein the computing means is a microcomputer.

8. The radar-directed projectile guidance system as claimed in claim 7 wherein the microcomputer is a single chip microcomputer.

9. The radar-directed projectile guidance system as claimed in claim 1 wherein the first slow wave, end-fire antenna comprises a dielectric rod comprising a conductor coated by a dielectric.

10. The radar-directed projectile guidance system as claimed in claim 1 wherein the first slow wave, end-fire antenna comprises a corrugated metallic conductor.

11. A radar-directed projectile comprising:
    (a) a first slow wave, end-fire antenna;
    (b) a noncoherent RF receiver; and
    (c) computing means for processing signals from the RF receiver;
    (d) a means for trajectory correction; and
    (e) a power system.

12. The radar-directed projectile as claimed in claim 11 wherein the means for trajectory correction is a divert mechanism comprised of one or more divert charges.

13. The radar-directed projectile as claimed in claim 11 wherein the means for trajectory correction is comprised of one or more piezoelectrically actuated aerodynamic surfaces.

14. The radar-directed projectile as claimed in claim 11 wherein the noncoherent RF receiver is integrated into a single GaAs chip.

15. The radar-directed projectile as claimed in claim 11 wherein the noncoherent RF receiver is a crystal video receiver.

16. The radar-directed projectile as claimed in claim 11 further comprising a second slow wave, end-fire antenna.

17. The radar-directed projectile as claimed in claim 11 further comprising a low noise amplifier preceding said noncoherent RF receiver.

18. The radar-directed projectile as claimed in claim 11 further comprising a power subsystem.

19. The radar-directed projectile as claimed in claim 11 wherein the computing means is a microcomputer.

20. The radar-directed projectile as claimed in claim 19 wherein the microcomputer is a single chip microcomputer.

21. The radar-directed projectile as claimed in claim 11 wherein the first slow wave, end-fire antenna comprises a dielectric rod comprising a conductor coated by a dielectric.

22. The radar-directed projectile as claimed in claim 11 wherein the first slow wave, end-fire antenna comprises a corrugated metallic conductor.

23. A projectile comprising:
    a guidance system wherein the guidance systems comprises:
        at least one end-fire antenna, wherein each of the at least one end-fire antenna comprises a radio frequency (RF) slow wave structure;
        an RF receiver operably connected to each of the at least one end-fire antenna; and
        an RF receiver signal processor for processing signals received via the RF receiver.

24. The projectile of claim 23 further comprising:
    a trajectory correction system operably responsive to one or more output signals from the RF receiver signal processor.

25. The projectile of claim 23 further comprising a power system.

* * * * *

UNITED STATES PATENT AND TRADEMARK OFFICE
CERTIFICATE OF CORRECTION

PATENT NO. : 7,079,070 B2 Page 1 of 1
APPLICATION NO. : 10/215475
DATED : July 18, 2006
INVENTOR(S) : Knut Kongelbeck and Ada Mendelovicz It is certified that error appears in the above-identified patent and that said Letters Patent is hereby corrected as shown below:

On the title page item (54), and col. 1, line 1,

"RADAR-FILTERED PROJECTILE"

should read

--RADAR-DIRECTED PROJECTILE--

Column 8, Line 25 replace "81" with --Θi--

Signed and Sealed this

Twenty-first Day of November, 2006

JON W. DUDAS
*Director of the United States Patent and Trademark Office*